(12) United States Patent
Sebastian (10) Patent No.: US 10,507,798 B1
(45) Date of Patent: Dec. 17, 2019

(54) AUTOMOBILE SECURITY SYSTEM (71) Applicant: Nick Sebastian, Woodside, NY (US)

(72) Inventor: Nick Sebastian, Woodside, NY (US)

( * ) Notice: Subject to any disclaimer, the term of this patent is extended or adjusted under 35 U.S.C. 154(b) by 101 days.

(21) Appl. No.: 15/805,316

(22) Filed: Nov. 7, 2017

(51) Int. Cl.
| | |
|---|---|
| *B60R 25/30* | (2013.01) |
| *B60R 25/04* | (2013.01) |
| *B60R 25/23* | (2013.01) |
| *G06K 9/00* | (2006.01) |
| *H04N 5/225* | (2006.01) |
| *G06K 9/62* | (2006.01) |
| *B60R 25/40* | (2013.01) |
| *G06F 16/583* | (2019.01) |

(52) U.S. Cl.
CPC ............ *B60R 25/305* (2013.01); *B60R 25/04* (2013.01); *B60R 25/23* (2013.01); *B60R 25/403* (2013.01); *G06F 16/5838* (2019.01); *G06K 9/00832* (2013.01); *G06K 9/6202* (2013.01); *H04N 5/2253* (2013.01)

(58) Field of Classification Search
CPC ....... B60R 25/04; B60R 25/045; B60R 25/23; B60R 25/25; B60R 25/305; B60R 25/403; G06F 16/5838; G06K 9/00832; G06K 9/6202; H04N 5/2253
See application file for complete search history.

(56) References Cited

U.S. PATENT DOCUMENTS

| | | | | |
|---|---|---|---|---|
| D344,483 S | | 2/1994 | Allen | |
| 6,252,978 B1 * | | 6/2001 | Grantz | B60R 25/252 |
| | | | | 180/272 |
| 6,888,445 B2 * | | 5/2005 | Gotfried | B60R 25/04 |
| | | | | 235/382 |
| 6,989,737 B2 * | | 1/2006 | Yasui | B60R 25/1025 |
| | | | | 340/426.1 |
| 7,279,806 B2 * | | 10/2007 | Hale | B60R 25/2009 |
| | | | | 307/10.4 |
| 7,315,233 B2 * | | 1/2008 | Yuhara | B60R 25/04 |
| | | | | 307/10.2 |
| 7,466,847 B2 * | | 12/2008 | Komura | B60R 25/25 |
| | | | | 382/118 |
| 7,602,947 B1 | | 10/2009 | Lemelson | |
| 7,679,486 B2 * | | 3/2010 | Okada | B60R 25/04 |
| | | | | 307/10.2 |

(Continued)

FOREIGN PATENT DOCUMENTS

| | | | |
|---|---|---|---|
| JP | 2000168502 A | * | 6/2000 |
| JP | 2016141349 A | * | 8/2016 |

(Continued)

*Primary Examiner* — Laura Freedman (57) ABSTRACT

The automobile security system prevents the unauthorized operation of a vehicle. The automobile security system comprises an imaging device, an override device, and a management device. The imaging device captures an image of a person that is attempting to initiate the operation of the vehicle. The management device compares the captured image to images of people authorized to operate the vehicle. If a match if found, the automobile security system enables the operation of the vehicle. Further opportunities are then given to: 1) review a display of images of people who operated or attempted to operate the vehicle; and, 2) authorize an additional person to operate the vehicle. The override device is provided to enable temporary operation of the vehicle.

18 Claims, 5 Drawing Sheets

(56) References Cited

U.S. PATENT DOCUMENTS

| | | | | |
|---|---|---|---|---|
| 7,760,070 B2* | 7/2010 | Ohtaki | ............... | B60R 25/04 340/426.1 |
| 8,005,269 B2 | 8/2011 | Weidhaas | | |
| 8,344,849 B2* | 1/2013 | Larsson | ............... | B60R 25/25 340/426.11 |
| 8,549,318 B2* | 10/2013 | White | ............... | B60K 28/063 701/1 |
| 8,744,642 B2* | 6/2014 | Nemat-Nasser | ...... | B60W 40/09 340/439 |
| 8,880,291 B2 | 11/2014 | Hampiholi | | |
| 9,043,048 B2* | 5/2015 | Manotas, Jr. | ....... | F02N 11/0807 701/2 |
| 9,082,237 B2* | 7/2015 | Breed | ............... | G06K 9/00369 |
| 9,272,689 B2* | 3/2016 | Fung | ............... | B60R 25/25 |
| 9,376,090 B2* | 6/2016 | Gennermann | ........ | B60R 25/20 |
| 9,381,890 B2* | 7/2016 | Lee | ............... | B60K 28/02 |
| 2002/0097145 A1* | 7/2002 | Tumey | ............... | B60R 25/04 340/426.28 |
| 2003/0212480 A1* | 11/2003 | Lutter | ............... | B60R 21/013 701/31.4 |
| 2006/0204059 A1 | 9/2006 | Ido | | |
| 2006/0215884 A1* | 9/2006 | Ota | ............... | B60R 25/04 382/118 |
| 2006/0261931 A1* | 11/2006 | Cheng | ............... | B60R 25/102 340/426.1 |
| 2006/0273880 A1* | 12/2006 | Yuhara | ............... | B60R 25/255 340/5.83 |
| 2007/0124599 A1* | 5/2007 | Morita | ............... | B60R 25/25 713/186 |
| 2012/0050010 A1* | 3/2012 | Largue | ............... | B60R 25/25 340/5.72 |
| 2013/0250108 A1 | 9/2013 | Du | | |
| 2014/0052333 A1* | 2/2014 | Elder | ............... | G06F 17/00 701/36 |

FOREIGN PATENT DOCUMENTS

| | | | |
|---|---|---|---|
| JP | 2017001615 A | * | 1/2017 |
| WO | 2006029739 A1 | | 3/2006 |

\* cited by examiner

AUTOMOBILE SECURITY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and vehicles in general, more specifically, a system for preventing or indicating unauthorized use of a vehicle that includes the use of a camera.

SUMMARY OF INVENTION

The automobile security system is configured for use with a vehicle. The automobile security system is a security device that prevents the operation of the vehicle by an unauthorized person. The automobile security system comprises an imaging device, an override device, and a management device. The imaging device captures an image of a person that is attempting to initiate the operation of the vehicle. The management device compares the captured image to previously captured images of people who are authorized to operate the vehicle. If a match if found, the automobile security system enables the operation of the vehicle. If a match is found, the person is given further opportunities: 1) to review a display of images of people who operated or attempted to operate the vehicle; and, 2) to identify an additional person authorized to operate the vehicle. If a match is not found, the person is given the opportunity to enter an override code through the override device. If a recognized override code is entered through the override device, the operation of the vehicle will be authorized for a predetermined amount of time. The intention of the override device is to allow temporary use of the vehicle for purposes such as valet parking.

These together with additional objects, features and advantages of the automobile security system will be readily apparent to those of ordinary skill in the art upon reading the following detailed description of the presently preferred, but nonetheless illustrative, embodiments when taken in conjunction with the accompanying drawings.

In this respect, before explaining the current embodiments of the automobile security system in detail, it is to be understood that the automobile security system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automobile security system.

It is therefore important that the claims be regarded as including such equivalent construction insofar as they do not depart from the spirit and scope of the automobile security system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The automobile security system 100 (hereinafter invention) is configured for use with a vehicle 151. The invention 100 is a security device that prevents the operation of the vehicle 151 by an unauthorized person 155. The invention 100 inhibits the ignition of the vehicle 151 until the authority of a person 155 attempting to operate the vehicle 151 has been verified. The invention 100 comprises an imaging device 101, an override device 102, and a management device 103. The imaging device 101 captures an image of a person 155 that is attempting to initiate the operation of the vehicle 151. The management device 103 compares the captured image to previously captured images of people who are authorized to operate the vehicle 151.

If a match if found, the invention 100 enables the operation of the vehicle 151. If a match is found, the person 155 is given further opportunities: 1) to review a display of images of people who operated or attempted to operate the vehicle 151; and, 2) to identify an additional person 155 authorized to operate the vehicle 151. If a match is not found, the person 155 is given the opportunity to enter an override code through an interface. If a recognized override code is entered through the override device 102, the operation of the vehicle 151 will be authorized for a predetermined amount of time. The intention of the override device 102 is to allow temporary use of the vehicle 151 for purposes such as valet parking.

Figure 1:
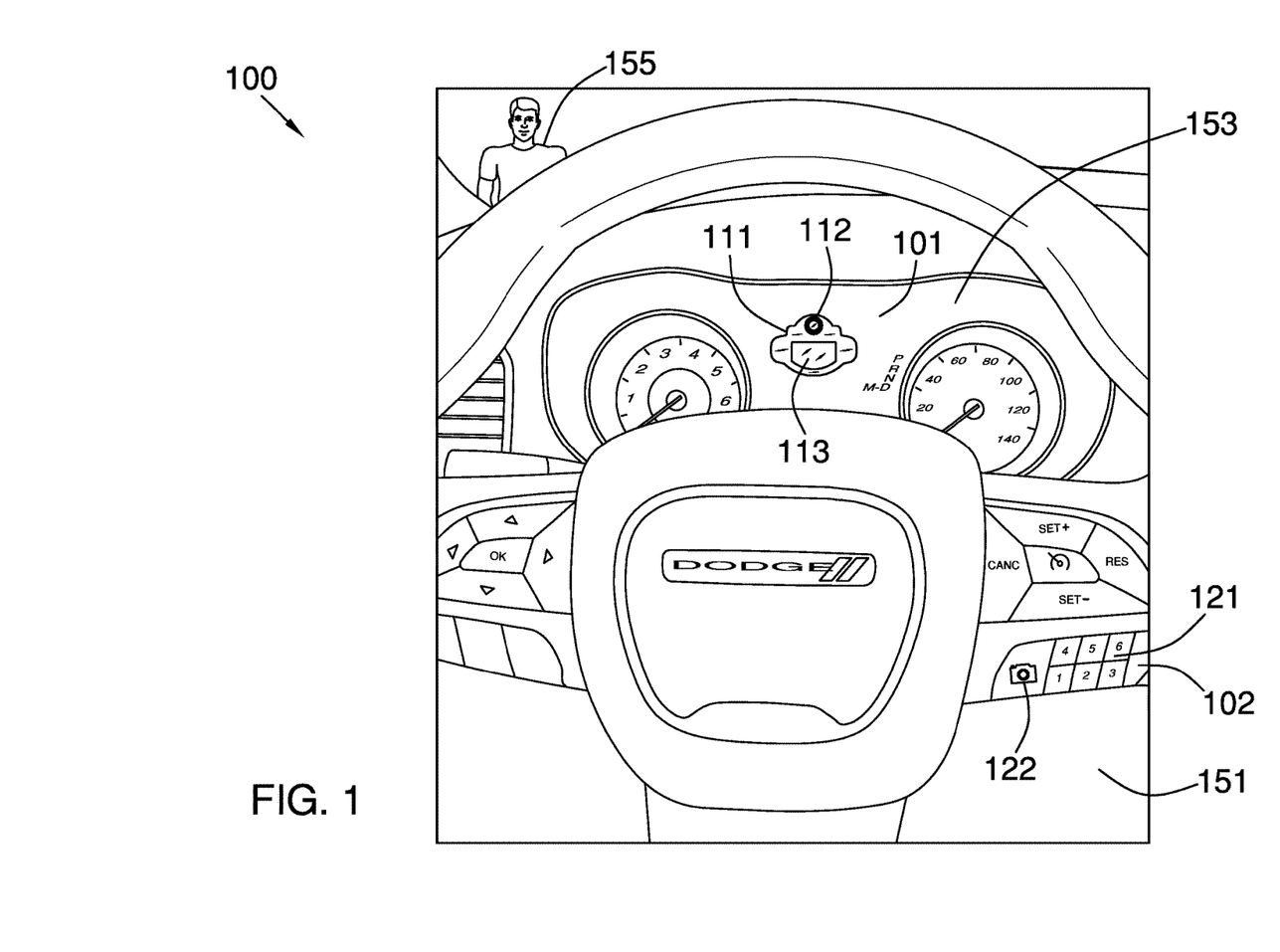
FIG. 1 is an in use view of an embodiment of the disclosure.

The vehicle 151 refers to a motorized device that is used to transport people or cargo over a road network. The vehicle 151 is further defined with a vehicle electrical control unit 152, a dash board 153, and a key 154. The vehicle electrical control unit 152 refers to an electronic device maintained within the vehicle 151 that controls the operation of all electrical subsystems within the vehicle 151. The dash board 153 refers to the operating console of the vehicle 151.

Figure 2:
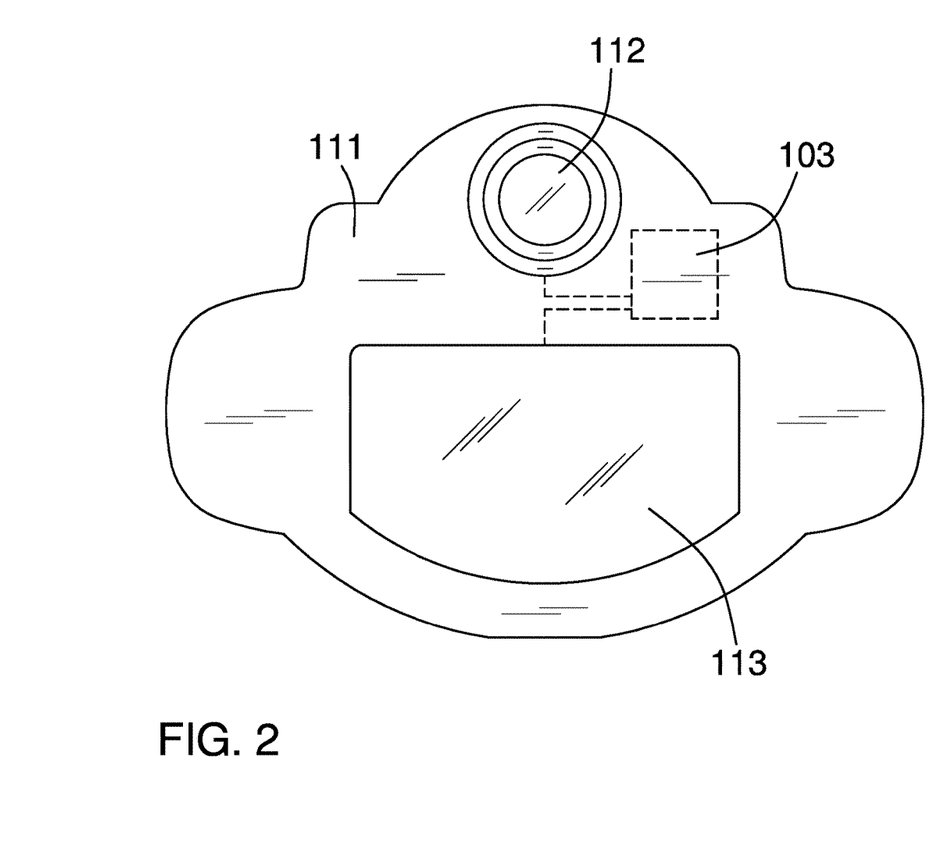
FIG. 2 is a front view of an embodiment of the disclosure.
Figure 3:
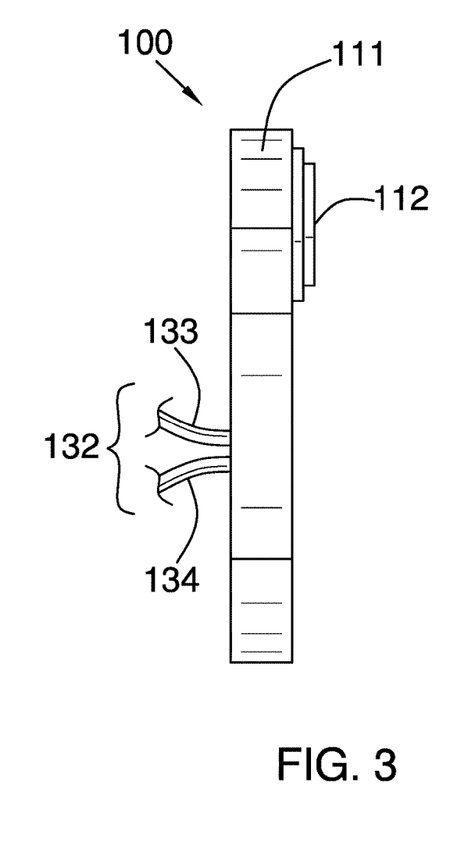
FIG. 3 is a side view of an embodiment of the disclosure.

The imaging device 101 is an electronic device that: 1) captures an image of a person 155 attempting to operate the vehicle 151; and, 2) displays one or more images or people who have previously operated or attempted to operate the vehicle 151. The imaging device 101 comprises a mounting plate 111, a camera 112, and a display 113. The mounting plate 111 is a structure upon which the camera 112 and the display 113 are mounted. The mounting plate 111 is attached to the dash board 153 of the vehicle 151. The camera 112 is a readily and commercially available electronic device that captures and stores images in a digital format. The display 113 is a readily and commercially available electronic device known as an LCD that is used to display images stored within the management device 103.

The override device 102 is an interface that allows for an independently authorized person 155 to operate the vehicle 151 for a predetermined amount of time. Specifically, the override device 102 receives a manually entered passcode. Once the passcode is validated by the management device 103, the ignition of the vehicle 151 is enabled for a previously determined amount of time. The override device 102 comprises a keypad 121 and a shutter 122. The keypad 121 is a readily and commercially available electronic device that comprises a set of switches, often referred to as buttons, which are used to input instructions into the management device 103. The shutter 122 is a readily and commercially available switch that is dedicated to manually initiating the operation of the camera 112. The shutter 122 is primarily intended for use with the authorization subsystem 143. The authorization subsystem 143 is discussed in more detail elsewhere in this disclosure.

Figure 4:
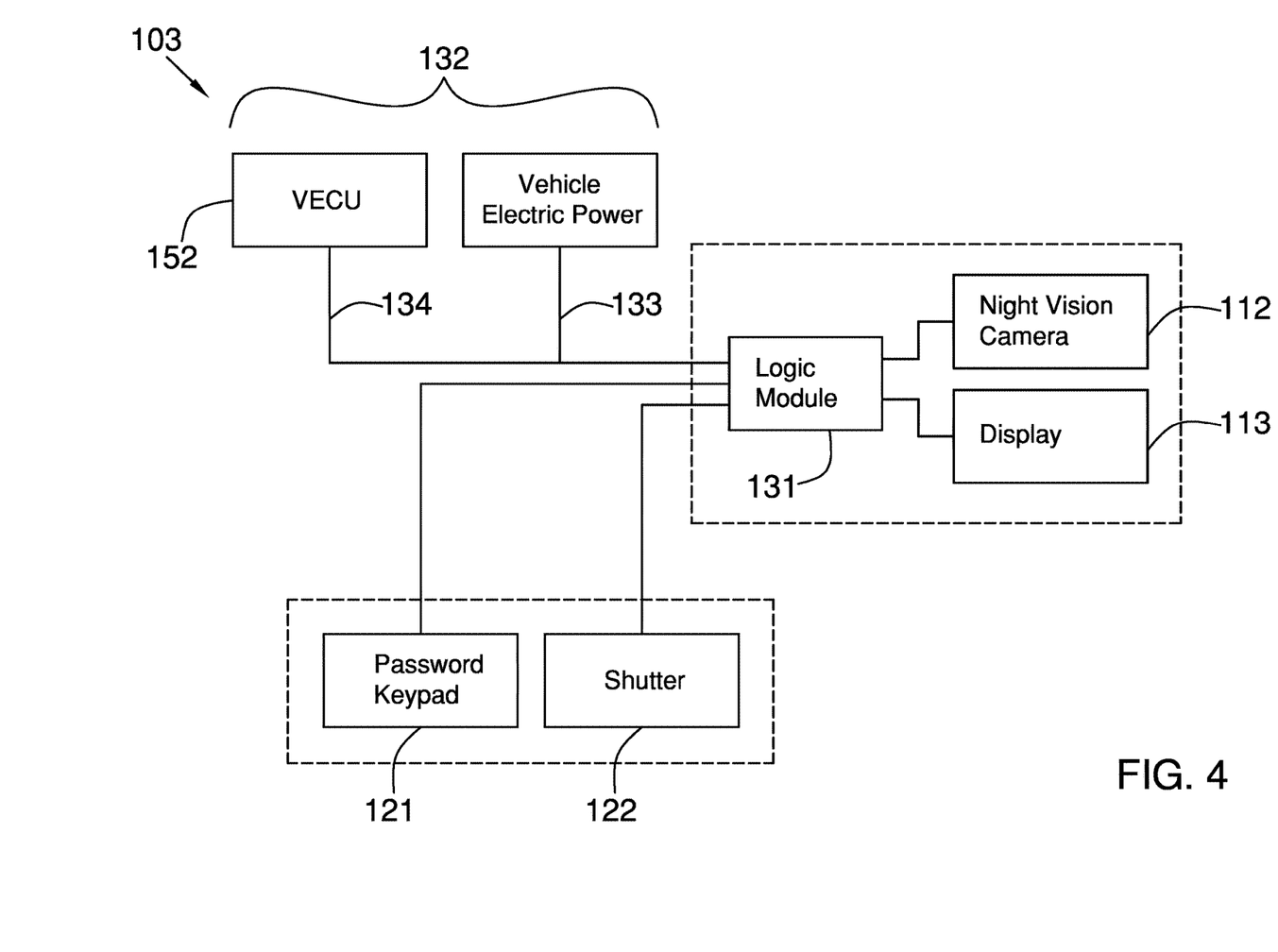
FIG. 4 is a block diagram of an embodiment of the disclosure.

The management device 103 is the control system of the invention 100. The management device 103: 1) maintains a database of images of people authorized to operate the vehicle 151 within which the invention 100 is installed; 2) captures, stores and matches the image of a person 155 attempting to operate the vehicle 151 with the images stored in the database of authorized images; 3) enables the ignition of the vehicle 151 if a match between the image of the person 155 attempting to operate the vehicle 151 and the database of authorized images is found; 4) monitors the override device 102 and enables the ignition of the vehicle 151 should a valid passcode be entered; 5) displays images of people who have recently operated or attempted to operate the vehicle 151; and, 6) adds images to the database of authorized images. The management device 103 interfaces with the vehicle electrical control unit 152 to send signals that enable and disable the ignition ability of the vehicle 151.

In a second potential embodiment of the disclosure, once the management device 103 has enabled the ignition ability of the vehicle 151, the management device 103 initiates the operation of a commercially available Global Positioning System (GPS) device that is enabled to receive a voice command to input a desired destination into the GPS device.

In a third potential embodiment of the disclosure, once the management device 103 has enabled the ignition ability of the vehicle 151, the camera 112 maintains a focus on the face of the driver of the vehicle 151. In this scenario, the management device 103 monitors the facial expressions of the driver to determine whether the driver is either drowsy or asleep. Upon identifying that the driver is either drowsy or asleep, the management device 103 sets off an audible alarm intended to wake the driver. Once the management device 103 confirms that the driver is alert, the management device 1-3 then generates a voice based announcement suggesting that the driver pull over and get some rest.

The management device 103 comprises a logic module 131 and a vehicle interface 132. The management device 103 further comprises an ignition subsystem 141, a driver display subsystem 142, and an authorization subsystem 143.

The logic module 131 is a readily and commercially available programmable electronic device that is used to manage, regulate, and operate the management device 103. Depending on the specific design and the selected components, the logic module 131 can be a separate component within the management device 103 or the functions of the logic module 131 can be incorporated into another component within the management device 103 or the vehicle electronic control unit 152. The use of a logic module 131 is well known and documented within the electrical arts. The logic module 131 is electrically interconnected with the camera 112, the display 113, the keypad 121, the shutter 122, the power connection 133, and the VECU interface 134.

The vehicle interface 132 is a general term that refers to the electrical connections between the management device 103 and the electrical systems of the vehicle 151. The vehicle interface 132 comprises a power connection 133 and a VECU interface 134. The power connection 133 comprises an electrical connection between the management device 103 and the electrical power system of the vehicle 151.

The power connection 133 draws the electrical energy required for the operation of the invention 100 from the vehicle 151.

The VECU interface 134 refers to an electrical interconnection between the invention 100 and the vehicle electrical control unit 152. The VECU interface 134 exchanges operational information between the logic module 131 and the vehicle electrical control unit 152. The logic module 131 sends signals to the vehicle electrical control unit 152 over the VECU interface 134 that enables and disables the ignition of the vehicle 151. Methods to design and implement a VECU interface 134 between a vehicle electrical control unit 152 and a logic module 131 are well-known and documented within the electrical and mechanical arts.

The ignition subsystem 141 refers to the mechanism that enables and disables the ignition of the vehicle 151. The driver display subsystem 142 refers to the mechanism that displays one or more images of people who operated or attempted to operate the vehicle 151. The authorization subsystem 143 refers to the mechanism by which images are added to the database of authorized images.

Figure 5:
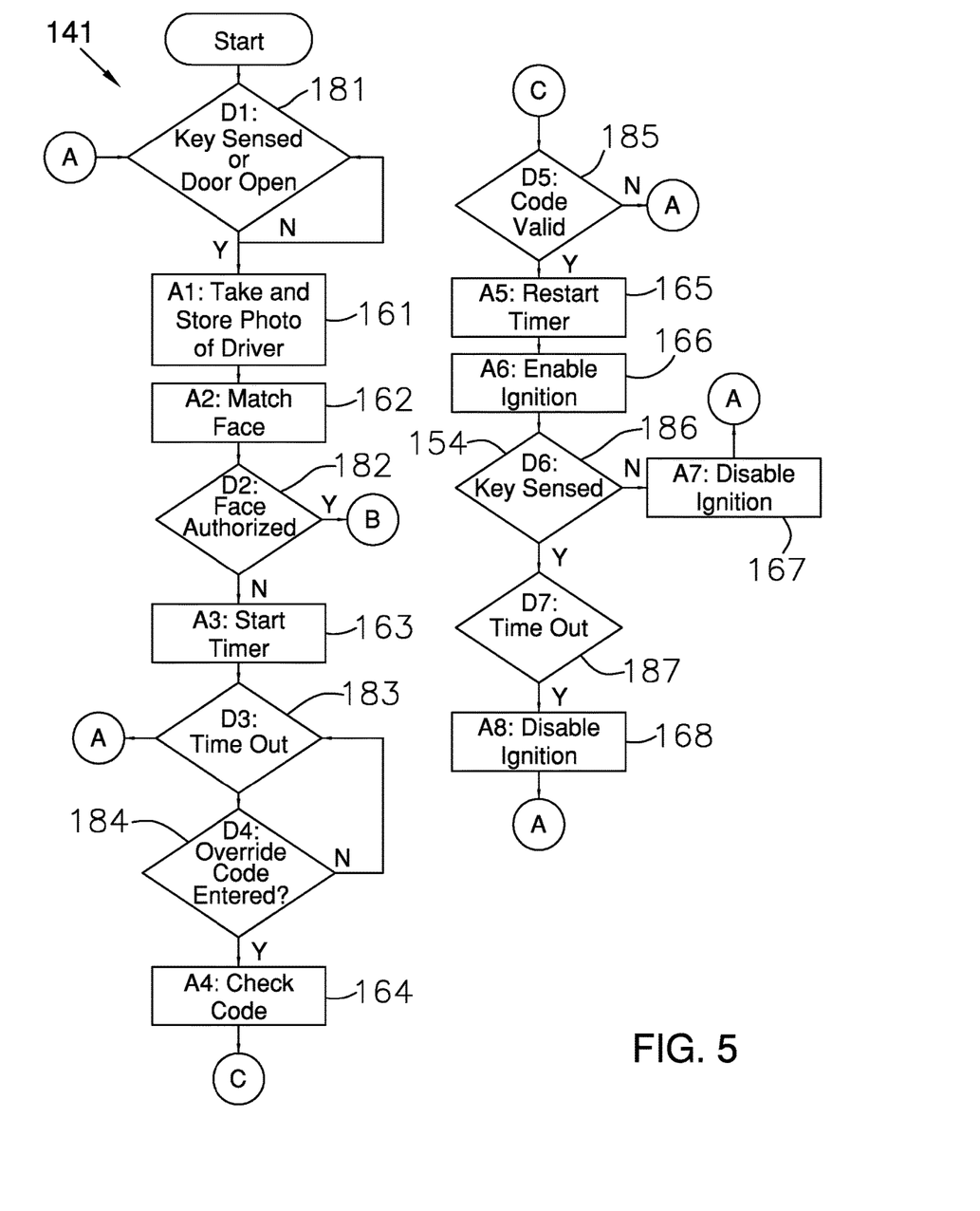
FIG. 5 is a flowchart of an embodiment of the disclosure.
Figure 6:
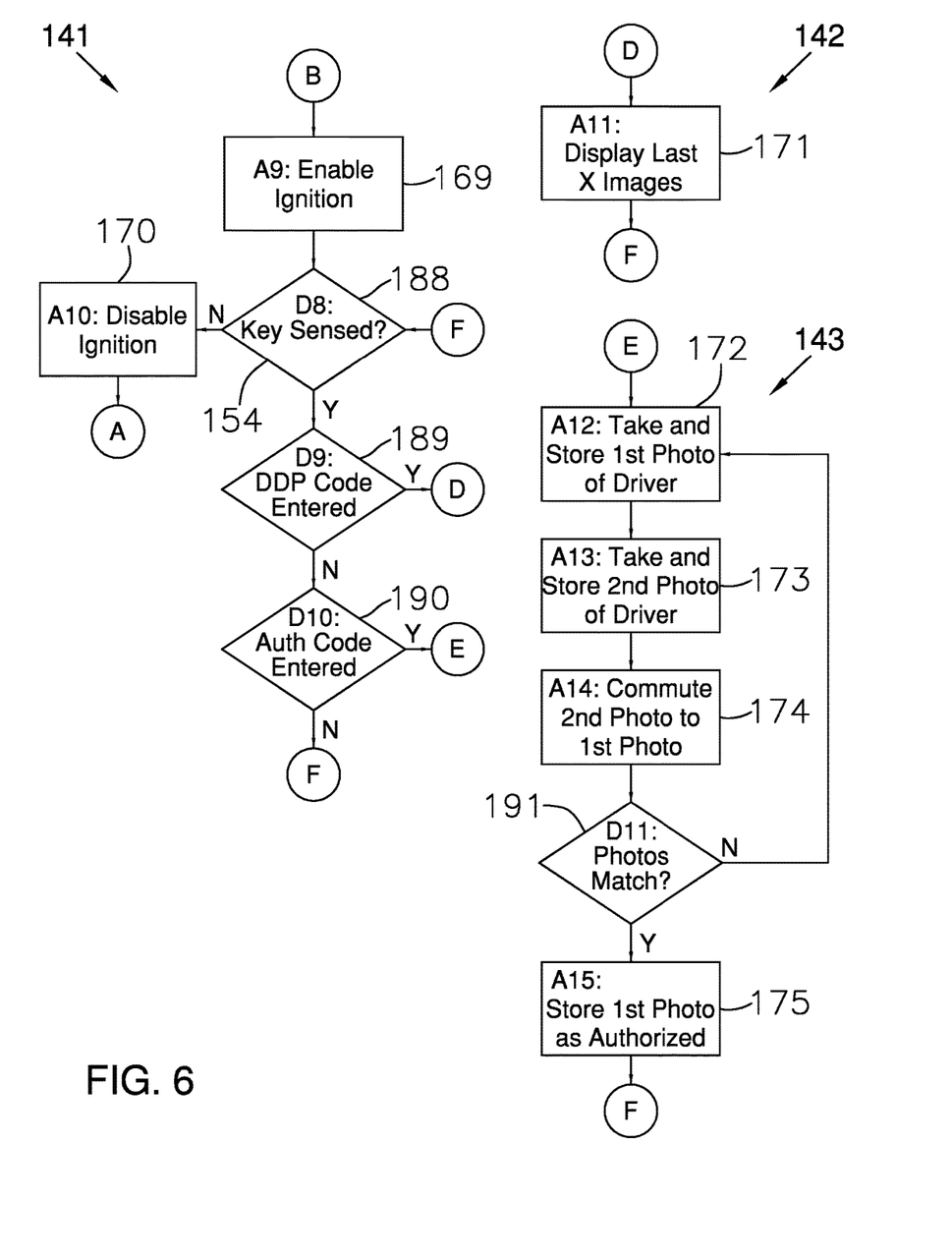
FIG. 6 is a flowchart of an embodiment of the disclosure.

The operation of the invention 100, as shown in FIGS. 5 and 6, is described in the following 13 paragraphs.

The operation of the ignition subsystem 141, as shown in FIG. 5, is described in the following 8 paragraphs.

The logic module 131 makes a first decision 181 to determine if the vehicle electrical control unit 152 senses either: 1) a key 154 within the vehicle electrical control unit 152 system; or 2) whether a vehicle 151 door is open. If either a key 154 is not sensed or all vehicle 151 doors are closed, the logic module 131 loops back to the first decision 181. If either a key 154 is sensed or a vehicle 151 door is open, the logic module 131 takes a first action 161 of having the camera 112 capture and store an image of the person 155 attempting to operate the vehicle 151.

The logic module 131 next takes a second action 162 of checking for a match between the captured image and the database of authorized images. The logic module 131 makes a second decision 182 to determine if a match has been made between the captured image and an image selected from the database of authorized images. If a match was made, the logic module 131 proceeds to the ninth action 169.

If a match was not made, the logic module 131 takes a third action 163 of starting a timer. Timers are commonly available within a commercially available logic module 131. The timer is a countdown timer that is set to a second predetermined amount of time. The logic module 131 makes a third decision 183 to determine whether the timer has expired. If the timer has expired, the logic module 131 loops back to the first decision 181.

If the timer has not expired, the logic module 131 makes a fourth decision 184 to determine whether an override code has been entered into the keypad 121. If an override code has not been entered, the logic module 131 loops back to the third decision 183. If an override code has been entered, the logic module 131 takes a fourth action 164 of checking the validity of the override code and makes a fifth decision 185 to determine whether the override code is valid. If the override code is not valid the logic module 131 loops back to the first decision 181. If the override code is valid the logic module 131 takes a fifth action 165 that resets the timer as a countdown timer set to a first predetermined amount of time.

The logic module 131 takes a sixth action 166 of sending a signal over the VECU interface 134 to the vehicle electrical control unit 152 that enables the ignition of the vehicle 151. The logic module 131 makes a sixth decision 186 to determine if the vehicle electrical control unit 152 senses a key 154 within the vehicle electrical control unit 152 system. If no key 154 is sensed, the logic module 131 takes a seventh action 167 of sending a signal over the VECU interface 134 to the vehicle electrical control unit 152 that disables the ignition of the vehicle 151 and the logic module 131 loops back to the first decision 181.

If a key 154 is sensed, the logic module 131 take a seventh decision 187 to determine if the timer has expired. If the timer has not expired, the logic module 131 loops back to the sixth decision 186. If the timer has expired, the logic module 131 takes an eighth action 168 of sending a signal over the VECU interface 134 to the vehicle electrical control unit 152 that disables the ignition of the vehicle 151 and the logic module 131 loops back to the first decision 181.

If, as a result of the second decision 182 an image match was made with the database of authorized images, the logic module 131 takes a ninth action 169 of sending a signal over the VECU interface 134 to the vehicle electrical control unit 152 that enables the ignition of the vehicle 151. The logic module 131 makes an eighth decision 188 to determine if the vehicle electrical control unit 152 senses a key 154 within the vehicle electrical control unit 152 system. If a key 154 is not sensed, the logic module 131 takes a tenth action 170 of sending a signal over the VECU interface 134 to the vehicle electrical control unit 152 that disables the ignition of the vehicle 151 and loops back to the first decision 181.

If a key 154 is sensed, the logic module 131 makes a ninth decision 189 of determining whether a driver display password (DDP) was entered into the keypad 121. If an appropriate DDP was entered, then the logic module 131 initiates the driver display subsystem 142 as described elsewhere in this disclosure. If an appropriate DDP was not entered, then the logic module 131 makes a tenth decision 190 to determine whether an authorization code to add an image to the database of authorized images was entered. If an appropriate authorization code was entered, then the logic module 131 initiates the authorization subsystem 143 as described elsewhere in this disclosure. If an appropriate authorization code was not entered, then the logic module 131 loops back to the eighth decision 188.

The operation of the driver display subsystem 142, as shown in FIG. 6, is described in this paragraph. The driver display subsystem 142 comprises an eleventh action 171. The logic module 131 takes a eleventh action 171 of displaying on the display 113 images of people who have been authorized or attempted to have been authorized to operate the vehicle 151. The logic module 131 terminates the operation of the driver display subsystem 142 by looping back to the eighth decision 188.

The operation of the authorization subsystem 143, as shown in FIG. 6, is described in the following 2 paragraphs.

The driver display subsystem 142 initiates with a twelfth action 172. The logic module 131 takes a twelfth action 172 of capturing a first photograph of a person 155 to be authorized to operate the vehicle 151. The logic module 131 takes a thirteenth action 173 of capturing a second photograph of a person 155 to be authorized to operate the vehicle 151. The logic module 131 takes a fourteenth action 174 of comparing the first photograph to the second photograph.

The logic module 131 makes an eleventh decision 191 to determine whether the first photograph matches the second photograph. If the second photograph does not match the first photograph, the logic module 131 loops back to the twelfth action 172. If the second photograph does match the first photograph, the logic module 131 takes a fifteenth action 175 of storing the first photograph in the database of authorized images after which the logic module 131 terminates the operation of the authorization subsystem 143 by looping back to the eighth decision 188.

To install the invention 100, the imaging device 101 is mounted in the dash board 153 of the vehicle 151 such that the field of view of the camera 112 captures any person 155 who is attempting to operate the vehicle 151. The override device 102 is mounted in the dash board 153 of the vehicle 151 such that the override device 102 is within reach of the person 155 operating the vehicle 151. It both preferred and anticipated that the management device 103 is mounted behind the dash board 153 of the vehicle 151.

The following definitions were used in this disclosure:

Automobile: As used in this disclosure, an automobile is a road vehicle that that specializes in carrying passengers and light cargo loads. This definition is specifically intended to include vehicles generally referred to as pickup trucks, vans, minivans, and sport utility vehicles.

Camera: As used in this disclosure, a camera is a sensor that converts light into electric signals that encode and records the spatial orientation of the captured light in a manner that reproduces the images seen by a human eye.

Control System: As used in this disclosure, a control system is a first device or system that manages and regulates the behavior or operation of a second device or system.

Display: As used in this disclosure, a display is a surface upon which is presented an image, potentially including, but not limited to, graphic images and text, that is interpretable by an individual viewing the projected image in a meaningful manner.

Image: As used in this disclosure, an image is an optical representation or reproduction of the appearance of something or someone.

Interface: As used in this disclosure, an interface is a physical or virtual boundary that separates two different systems across which information is exchanged.

LCD: As used in this disclosure, LCD is an acronym for Liquid Crystal Display. A liquid crystal display comprises a liquid crystal film placed between two sheets of transparent material. The visual characteristics of the can be varied through the application of a voltage.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance. As defined in this disclosure, plates may be made of any material.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a motorized vehicle is a device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A security device comprising:
    an imaging device, an override device, and a management device;
    wherein the imaging device is adapted to capture an image of a person who is attempting to initiate an operation of a vehicle;
    wherein the management device is adapted to compare the captured image to previously captured images of people who are authorized to operate the vehicle;
    wherein the security device is configured for use with said vehicle;
    wherein the vehicle is adapted to be operated by said person;
    wherein the security device is adapted to prevent the operation of the vehicle by an unauthorized person;
    wherein the security device is adapted to disable an ignition of the vehicle until an authority of said person attempting to operate the vehicle is verified by the security device;
    wherein an override code is adapted to be entered by said person;
    wherein if a recognized override code is entered through the override device said ignition of the vehicle is enabled;
    wherein the vehicle is further defined with a vehicle electrical control unit, a dash board, and a key;
    wherein the override device comprises a keypad and a shutter;
    wherein the override device attaches to the dash board of the vehicle;
    wherein the keypad is an electronic device that comprises one or more switches;
    wherein the shutter is a switch;
    wherein the shutter manually initiates an operation of a camera.

2. The security device according to claim 1
    wherein the imaging device is an electronic device;
    wherein the imaging device is adapted to display one or more images of people who have previously attempted to operate the vehicle.

3. The security device according to claim 2
    wherein the imaging device comprises a mounting plate, said camera, and a display;
    wherein the mounting plate is a structure upon which the camera and the display are mounted.

4. The security device according to claim 3
    wherein the mounting plate attaches to the dash board of the vehicle;
    wherein the camera is an electronic device that captures and stores images in a digital format;
    wherein the display is an LCD.

5. The security device according to claim 4
    wherein the override device is an interface;
    wherein the override device allows for an independently authorized person to enable said ignition;
    wherein the override device enables the ignition for a first predetermined amount of time;
    wherein the override device receives a manually entered passcode.

6. The security device according to claim 5
    wherein the management device maintains a database of images of persons authorized to operate the vehicle
    wherein the management device captures, stores and matches the image of said person attempting to operate the vehicle with the images stored in the database of authorized images;
    wherein the management device enables the ignition of the vehicle if a match between the image of the person attempting to operate the vehicle and the database of authorized images is found;
    wherein the management device monitors the override device and enables the ignition of the vehicle when a valid passcode is entered;
    wherein the management device displays images of people who have recently operated or attempted to operate the vehicle;
    wherein the management device adds images to the database of authorized images;

wherein the management device interfaces with the vehicle electrical control unit to send signals that enables and disables an ignition ability of the vehicle.

7. The security device according to claim 6
wherein the management device comprises a logic module and a vehicle interface;
wherein the logic module electrically interconnects with the vehicle interface;
wherein the vehicle interface further comprises a VECU interface and a power connection;
wherein the power connection comprises an electrical connection between the management device and an electrical power system of the vehicle;
wherein the VECU interface refers to an electrical interconnection between the security device and the vehicle electrical control unit;
wherein the VECU interface exchanges operational signals between the logic module and the vehicle electrical control unit.

8. The security device according to claim 7
wherein the management device further comprises an ignition subsystem, a driver display subsystem, and an authorization subsystem;
wherein the ignition subsystem is a mechanism that enables and disables the ignition of the vehicle;
wherein the driver display subsystem is a mechanism that displays one or more images of people who operated or attempted to operate the vehicle;
wherein the authorization subsystem is a mechanism by which images are added to the database of authorized images.

9. The security device according to claim 8
wherein the logic module is electrically interconnected with the camera, the display, the keypad, the shutter, the power connection, and the VECU interface;
wherein the logic module sends signals to the vehicle electrical control unit over the VECU interface that enables and disables the ignition of the vehicle.

10. The security device according to claim 8
wherein the logic module is electrically interconnected with the imaging device, the override device, the power connection, and the VECU interface;
wherein the logic module makes a first decision to determine if the vehicle electrical control unit senses a key within the vehicle electrical control unit;
wherein the logic module takes a first action of having the camera capture and store an image of the person attempting to operate the vehicle;
wherein the logic module takes a second action of checking for a match between the captured image and the database of authorized images;
wherein the logic module makes a second decision to determine if a match has been made between the captured image and an image selected from the database of authorized images;
wherein the logic module takes a third action of starting a first timer;
wherein the first timer is a countdown timer that is set to a second predetermined amount of time;
wherein the logic module makes a third decision to determine whether the first timer has expired;
wherein the logic module makes a fourth decision to determine whether said override code has been entered into the keypad;
wherein if said override code has been entered, the logic module takes a fourth action of checking a validity of the override code
wherein the logic module makes a fifth decision to determine whether the override code is valid;
wherein the logic module takes a fifth action that sets a second timer as a countdown timer set to the first predetermined amount of time;
wherein the logic module takes a sixth action of sending a signal over the VECU interface to the vehicle electrical control unit that enables the ignition of the vehicle;
wherein the logic module makes a sixth decision to determine if the vehicle electrical control unit senses a key within the vehicle electrical control unit system;
wherein the logic module takes a seventh action of sending a signal over the VECU interface to the vehicle electrical control unit that disables the ignition of the vehicle;
wherein the logic module take a seventh decision to determine if the second timer has expired;
wherein the logic module makes an eighth decision of determining whether a driver display password (DDP) was entered into the keypad;
wherein the logic module makes a ninth decision to determine whether an authorization code to add an image to the database of authorized images was entered;
wherein the logic module takes an eighth action of displaying on the display images of people who have attempted to be authorized to operate the vehicle;
wherein the logic module terminates the operation of the driver display subsystem by looping back to the eighth action;
wherein the logic module takes a ninth action of capturing a first photograph of said person to be authorized to operate the vehicle;
wherein the logic module takes a tenth action of capturing a second photograph of said person to be authorized to operate the vehicle;
wherein the logic module takes an eleventh action of comparing the first photograph to the second photograph;
wherein the logic module makes a tenth decision to determine whether the first photograph matches the second photograph;
wherein the logic module takes a fifteenth action of storing the first photograph in the database of authorized images.

11. The security device according to claim 1
wherein the management device comprises a logic module and a vehicle interface;
wherein the logic module electrically interconnects with the vehicle interface;
wherein the vehicle interface further comprises a VECU interface and a power connection;
wherein the power connection comprises an electrical connection between the management device and an electrical power system of the vehicle;
wherein the VECU interface refers to an electrical interconnection between the security device and the vehicle electrical control unit;
wherein the VECU interface exchanges operational signals between the logic module and the vehicle electrical control unit.

12. The security device according to claim 11
wherein the logic module is electrically interconnected with the imaging device, the override device, the power connection, and the VECU interface;

wherein the logic module makes a first decision to determine if the vehicle electrical control unit senses a key within the vehicle electrical control unit;

wherein the logic module takes a first action of having said camera capture and store an image of the person attempting to operate the vehicle;

wherein the logic module takes a second action of checking for a match between the captured image and a database of authorized images;

wherein the logic module makes a second decision to determine if a match has been made between the captured image and an image selected from the database of authorized images;

wherein the logic module takes a third action of starting a first timer;

wherein the first timer is a countdown timer that is set to a second predetermined amount of time;

wherein the logic module makes a third decision to determine whether the first timer has expired;

wherein the logic module makes a fourth decision to determine whether said override code has been entered into said keypad;

wherein if said override code has been entered, the logic module takes a fourth action of checking a validity of the override code;

wherein the logic module makes a fifth decision to determine whether the override code is valid;

wherein the logic module takes a fifth action that sets a second timer as a countdown timer set to said first predetermined amount of time;

wherein the logic module takes a sixth action of sending a signal over the VECU interface to the vehicle electrical control unit that enables the ignition of the vehicle;

wherein the logic module makes a sixth decision to determine if the vehicle electrical control unit senses a key within the vehicle electrical control unit system;

wherein the logic module takes a seventh action of sending a signal over the VECU interface to the vehicle electrical control unit that disables the ignition of the vehicle;

wherein the logic module take a seventh decision to determine if the second timer has expired;

wherein the logic module makes an eighth decision of determining whether a driver display password (DDP) was entered into the keypad;

wherein the logic module makes a ninth decision to determine whether an authorization code to add an image to the database of authorized images was entered;

wherein the logic module takes an eighth action of displaying on said display images of people who have attempted to be authorized to operate the vehicle;

wherein the logic module terminates the operation of a driver display subsystem by looping back to the eighth decision;

wherein the logic module takes a ninth action of capturing a first photograph of said person to be authorized to operate the vehicle;

wherein the logic module takes a tenth action of capturing a second photograph of said person to be authorized to operate the vehicle;

wherein the logic module takes an eleventh action of comparing the first photograph to the second photograph;

wherein the logic module makes a tenth decision to determine whether the first photograph matches the second photograph;

wherein the logic module takes a fifteenth action of storing the first photograph in the database of authorized images.

13. The security device according to claim 12
wherein the imaging device is an electronic device;
wherein the imaging device displays one or more images or people who have previously attempted to operate the vehicle.

14. The security device according to claim 13
wherein the imaging device comprises a mounting plate, said camera, and said display;
wherein the mounting plate is a structure upon which the camera and the display are mounted.

15. The security device according to claim 14
wherein the camera is electrically connected to the logic module;
wherein the display is electrically connected to the logic module.

16. The security device according to claim 15
wherein the mounting plate attaches to the dash board of the vehicle;
wherein the camera is an electronic device that captures and stores images in a digital format;
wherein the display is an LCD.

17. The security device according to claim 16 wherein the override device is an interface;
wherein the override device allows for an independently authorized person to enable said ignition;
wherein the override device enables the ignition for said first predetermined amount of time;
wherein the override device receives a manually entered passcode.

18. The security device according to claim 17
wherein the keypad is electrically connected to the logic module;
wherein the shutter is electrically connected to the logic module.

* * * * *